United States Patent
Ranganathan et al.

(10) Patent No.: US 10,373,161 B2
(45) Date of Patent: Aug. 6, 2019

(54) OFFLINE MOBILE PHONE PAYMENTS

(75) Inventors: Prashanth Ranganathan, San Francisco, CA (US); Alexander Olson, San Jose, CA (US); Tobias Speckbacher, Menlo Park, CA (US)

(73) Assignee: PAYPAL, INC., San Jose, CA (US)

( * ) Notice: Subject to any disclaimer, the term of this patent is extended or adjusted under 35 U.S.C. 154(b) by 1124 days.

(21) Appl. No.: 13/341,376

(22) Filed: Dec. 30, 2011

(65) Prior Publication Data

US 2013/0173474 A1    Jul. 4, 2013

(51) Int. Cl.
| | | |
|---|---|---|
| *G06Q 20/40* | (2012.01) | |
| *G06Q 20/36* | (2012.01) | |
| *G06Q 20/06* | (2012.01) | |
| *G06Q 20/20* | (2012.01) | |
| *G06Q 20/32* | (2012.01) | |

(52) U.S. Cl.
CPC ....... *G06Q 20/401* (2013.01); *G06Q 20/0655* (2013.01); *G06Q 20/20* (2013.01); *G06Q 20/3224* (2013.01); *G06Q 20/367* (2013.01); *G06Q 20/3674* (2013.01)

(58) Field of Classification Search
USPC .................................... 705/65, 67
See application file for complete search history.

(56) References Cited

U.S. PATENT DOCUMENTS

| | | | | |
|---|---|---|---|---|
| 8,037,193 | B2 | 10/2011 | Hay et al. | |
| 2003/0061170 | A1* | 3/2003 | Uzo | G06Q 20/06 705/64 |
| 2007/0094721 | A1* | 4/2007 | Nguyen | G06Q 50/34 726/9 |
| 2009/0048979 | A1* | 2/2009 | Al-Herz | G06Q 20/06 705/67 |
| 2009/0307139 | A1* | 12/2009 | Mardikar et al. | 705/67 |
| 2010/0250290 | A1* | 9/2010 | Lefkowitz | G06Q 10/02 705/5 |
| 2010/0276484 | A1* | 11/2010 | Banerjee | G06Q 30/06 235/379 |
| 2011/0218868 | A1 | 9/2011 | Young et al. | |
| 2012/0023567 | A1* | 1/2012 | Hammad | G06Q 20/12 726/9 |
| 2012/0058826 | A1* | 3/2012 | Amaitis et al. | 463/42 |
| 2012/0265585 | A1* | 10/2012 | Muirbrook et al. | 705/13 |

(Continued)

*Primary Examiner* — Jay Huang
(74) *Attorney, Agent, or Firm* — Haynes and Boone, LLP (57) ABSTRACT

A method for performing vending transactions includes generating a token upon request by a wireless appliance is provided. The method includes placing the token in a remote server; placing the token in the wireless appliance; providing the token from the wireless appliance to a point-of-sale (POS) terminal; authenticating the token with the remote server; validating the token to perform the vending transaction; and deleting the token from the remote server when the vending transaction is complete. A method for using a wireless appliance in vending transactions is provided. A method for using a remote server configured to connect to a wireless appliance and a POS terminal in vending transactions is provided. A system to perform vending transactions using an internet connection as above is provided. The system may include a remote server including a private account; the remote server configured to communicate with a POS terminal and a wireless appliance.

19 Claims, 4 Drawing Sheets

(56) References Cited

U.S. PATENT DOCUMENTS

| | | | |
|---|---|---|---|
| 2013/0018705 A1* | 1/2013 | Heath | G08G 1/017 705/13 |
| 2013/0060688 A1* | 3/2013 | Hurst | G06Q 30/06 705/41 |

* cited by examiner

OFFLINE MOBILE PHONE PAYMENTS

BACKGROUND

1. Field of the Invention

Embodiments described herein relate to the field of online commerce. More particularly, embodiments described herein are related to the field of remote vending transactions.

2. Description of Related Art

Wireless appliances used to connect to the internet are being increasingly used for online, onsite commerce. In many instances, a vending transaction may be carried-through remotely, via a wireless appliance carried by a purchaser. Thus, a purchaser may perform a payment for merchandise at a store location, without cash or a credit card being processed by the vendor. One of the problems that normally arise in this type of transaction is the lack of connectivity for the wireless appliance at certain store locations. Indeed, for indoor facilities it may be difficult to reach a wireless signal through a wireless appliance, thus frustrating the entire vending operation. The loss of commercial opportunity may be large, when considering that a large portion of the population carries wireless appliances. Also, a considerable portion of the population has online payment accounts through a variety of service providers and this trend continues to increase.

Another problem that arises in vending transactions conducted over the internet using wireless appliances is information security. A number of malicious applications have appeared that may retrieve key account information from users. Generically called 'malware', these applications may intrude into the operating system of wireless appliances to access information stored or processed in them.

Therefore, there is a need for a system that enables offline, onsite payments using a remote account in a secure manner.

SUMMARY

According to embodiments disclosed herein a method for performing vending transactions includes generating a token upon request by a wireless appliance; placing the token in a remote server; placing the token in the wireless appliance; providing the token from the wireless appliance to a point-of-sale (POS) terminal; authenticating the token with the remote server; validating the token to perform the vending transaction; and deleting the token from the remote server when the vending transaction is complete.

According to some embodiments, a method for using a wireless appliance in vending transactions may include requesting a token from a remote server having an account to which the wireless appliance is registered; wherein the token includes a time stamp and a geofence for validation; providing the token to a point-of-sale (POS) terminal using a communication device; completing the vending transaction when the token is validated; and deleting the token from the wireless appliance when the vending transaction is complete.

Further according to embodiments disclosed herein a method for using a remote server configured to connect to a wireless appliance and a POS terminal may include receiving a request for a first token from the wireless appliance; generating the first token including a time stamp and a geofence for validation; validating a second token received from the POS terminal; deleting the second token from the server account when the validation fails; deleting the second token from the server account when a vending transaction is complete.

According to embodiments disclosed herein a system to perform vending transactions using an internet connection may include a remote server including a private account; the remote server configured to communicate to a wireless appliance and to a POS terminal; the remote server further including a plurality of tokens having copies in a wireless appliance; wherein each of the plurality of tokens includes a time stamp and a geofence; the remote server is configured to receive a validation request from the POS terminal; the remote server is configured to provide funds from the private account to a vendor associated to the POS terminal when the validation succeeds; the remote server is configured to delete one of the plurality of tokens when the validation fails; and the remote server is configured to provide a receipt to the wireless appliance when the funds are provided from the private account to the vendor.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

Online payments and vending transactions are becoming more prevalent, as wireless and network technologies advance. Concepts such as "wallet-in-the-cloud" and "payment-in-the-cloud" have emerged, referring to the availability of private funds and money accounts in a remote server. These private accounts may be used for cash transactions using a mobile devices, or wireless appliances. More generally, an "intelligence-in-the-cloud" concept includes not only managing money accounts but also the linkage of the money accounts with other operations such as GPS location and pattern recognition algorithms.

Techniques and methods are currently used to facilitate the use of wireless appliances for vending transactions. However, most techniques tend to include key account and personal information stored in the wireless appliance. In some approaches, while the key account and personal information may not be stored in the wireless appliance, it may be transferred from the wireless appliance to a point-of-sale (POS) terminal or from a remote server to the wireless appliance. In either situation, the information may be maliciously captured while transmitting in or out of the wireless device. Prevention of this type of fraud is complicated as it requires use of complex encryption algorithms that need to be constantly modified.

Embodiments consistent with the present disclosure provide a simple method and system for performing a vending transaction using a wireless appliance. The method avoids compromising sensitive account information from the user since no account information form the user is transmitted through a wireless appliance. Security features in embodiments disclosed herein include: fast expiration of payment authorizations, use bounded by location, and use restricted by device or user identification protocols. Features enhancing the availability of methods and systems consistent with the present disclosure include operability when no network connectivity is available in a store. Further, in some embodiments a background process in a client application maintains a valid token cache for a selected lifetime of the tokens.

Some embodiments as disclosed herein may include desirable features such as quick payment processing. Accordingly, some embodiments may be as fast as, or quicker, than credit cards. Some embodiments further enable flexibility in client-merchant interface. For example, a token from the token cache may be presented to a POS terminal in many formats. Embodiments consistent with the present disclosure allow integration of a remote account manager, such as PayPal® to be integrated to a POS terminal or another funding instrument. Embodiments disclosed herein can work with any reasonably smart POS terminal that has the ability to run third-party applications.

Figure 1:
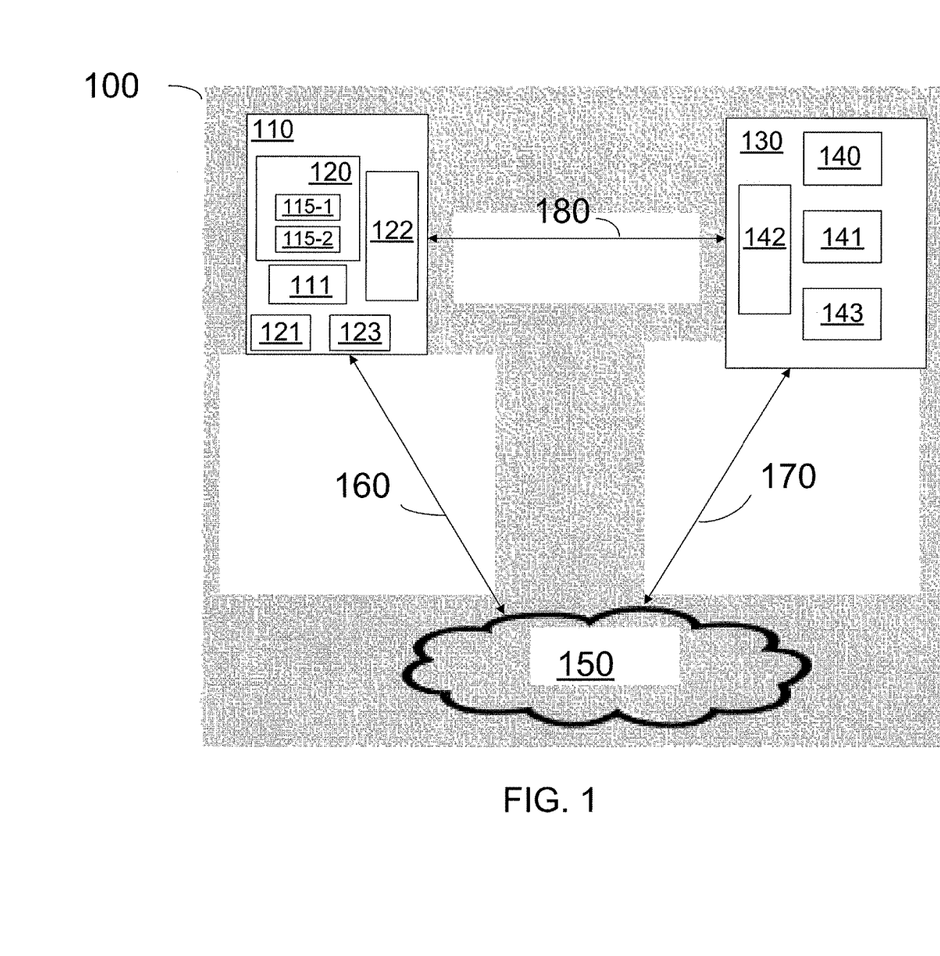
FIG. 1 shows a partial view of a system for making offline wireless phone payments, according to embodiments disclosed herein.

FIG. 1 shows a partial view of a system 100 for making offline wireless phone payments, according to embodiments disclosed herein. System 100 includes a wireless appliance 110, a POS terminal 130, and a remote server 150. Wireless appliance 110 and POS terminal 130 are able to communicate with remote server 150 through internet connections 160 and 170, respectively. The nature of internet connection 160 may be different form that of internet connection 170. Furthermore, a carrier service or internet provider for internet connection 160 may not be the same as a carrier service or internet provider for internet connection 170. For example, in some embodiments internet connection 160 may be provided through a cellular phone network, and internet connection 170 may be provided via a modem, a cable modem, or optical fiber. Further, wireless appliance 110 is able to communicate with POS terminal 130 through connection 180. Connection 180 may be provided optically, or through a near field communication (NFC) device. For example, connection 180 may be established by tapping or swiping wireless appliance 110 near or onto POS terminal 130. In some embodiments, connection 180 may be established by direct contact between wireless appliance 110 and POS terminal 130.

According to embodiments consistent with the present disclosure wireless appliance 110 may be a mobile phone, a cellular phone, an i-Phone®, an i-Pad®, or any other form of mobile device having internet connection capability.

According to embodiments disclosed herein, wireless appliance 110 includes a communication device 122, a memory chip 120, a processor chip 121, a wireless transceiver 123, and a plurality of tokens 115-1, 115-2. Tokens 115-1 and 115-2 are used in vending transactions as a surrogate for cash. In some embodiments, tokens 115 are valid payment authorization objects, configured for one-time use. In some embodiments each token 115-1 may have associated a specific cash value. In such embodiments, a vendor in possession of token 115-1 may redeem the token against a remote private account for the cash value associated to the token. According to some embodiments consistent with the present disclosure, a token such as 115-1 or 115-2 may simply indicate a purchase authorization, similar to a "blank check." Thus, in some embodiments a vendor in possession of token 115-1 may redeem the token for the cash value associated to the vending transaction.

FIG. 1 shows only two tokens 115-1 and 115-2; however, the number of tokens included is not limiting and can be any integer value, N. Communication device 122 may be a short range communication device including an optical device and detector, a barcode display, a two-dimensional (2D) display, a high frequency acoustic microphone, an RFID transmitter, or any combination of the above.

According to embodiments consistent with the present disclosure, application 111 on wireless appliance 110 includes software and instructions to create tokens 115-1 and 115-2. Also, application 111 may include software and instructions to access tokens 115-1 and 115-2, and transmit the tokens using communication device 122. Application 111 may be a cell-phone application related to a specific provider of remote private accounts, such as PayPal®. Application 111 includes instructions and commands to control processor 121 and memory 120 for operations related to a remote private account, managed by server 150. Thus, application 111 may also have access to wireless transceiver 123 in order to use internet connection 160. In some embodiments, application 111 is running in the background without user intervention, and periodically contacts server 150 to inquire information about a remote private account. For example, application 111 may periodically request server 150 to generate tokens 115-1 and 115-2, to be used for purchasing transactions. Any time a token 115 is invalidated or used, application 111 may ask server 150 for a replacement token, in order to maintain a cache of valid tokens in memory circuit 120.

At the time of a request by application 111, wireless appliance 110 transmits its location to server 150. According to embodiments where internet connection 160 is managed by a cellular phone service carrier, server 150 may independently verify the location of appliance 110 by using a carrier report on the cell phone location. According to some embodiments, the location of wireless appliance 110 may be specified by a longitude (South/North) and a latitude (East/West) values. Server 150 also sets a time stamp including an expiration time for the token, at the time the token is requested by application 111. According to some embodiments, application 111 may request any number of tokens, N. Thus, according to embodiments consistent with the present disclosure, there is a plurality of tokens 115-1 through 115-N available when wireless appliance 110 is offline. If internet connection 160 is lost, tokens stored in memory circuit 120 may remain valid and redeemable until their expiration time. Tokens present in memory circuit 120 may be used even when wireless appliance 110 is not connected through internet connection 160. When internet connection 160 is recovered, new tokens may be requested automatically by application 111, running in the background.

In some embodiments consistent with the present disclosure, tokens 115-1 and 115-2 are stored in memory circuit 120 in a first-in-first-out (FIFO) buffer. That is, the first token 115 created is the first token that will be used by application 111. In this manner, the validity time of a token 115 in memory circuit 120 is maximized. This reduces the need for application 111 to request new tokens from server 150.

Further according to embodiments consistent with the present disclosure, a time stamp and a location is associated to each token 115-1, 115-2, or 115-j, where j is less than or equal to N. Embodiments disclosed herein feature a high level of risk mitigation by incorporating several built-in security measures. This may greatly reduce likelihood of fraud or stolen payment credentials. The validity of a token is bounded by time and location. Some embodiments may further validate a token by identification of the wireless appliance or the user carrying the appliance. Identification of the wireless appliance or the user may be carried through by the network providing internet connection 160 to which wireless appliance 110 is subscribed. In some embodiments, identification is provided by an Apple Push Notification Service (APNS) or equivalent, used by wireless appliance 110. In some embodiments, identification of wireless appliance 110 may include confirmation, by the network providing internet connection 160, of the true location of wireless appliance 110.

In some embodiments, the user carrying wireless appliance 110 may desire to purchase an item at a store. Then the user launches application 111 into the foreground. In some embodiments, the user may desire to launch application 111 into the foreground to view tokens 115 and other sensitive personal and financial data. Launching application 111 into the foreground may include presenting a password or pin-unlock to ensure user identification. Furthermore, application 111 may be launched to the foreground using fingerprint identification, and other biometric measures. Once launched in the foreground, application 111 instructs processor 121 to access tokens 115-1 and 115-2 from memory 120, and transfers them to POS terminal 130 through communication device 122, for payment. Tokens 115-1 and 115-2 can be presented to the POS terminal in the form of a barcode, a quick response (QR) code, transmitted via sound, ultrasound or by NFC.

As shown in FIG. 1 POS terminal 130 includes a processor circuit 141, a memory circuit 140, a remote transceiver 143, and a communication device 142. Communication device 142 may include a bar code, a QR code reader, or an NFC reader. Communication device 142 is able to receive and transmit information between POS terminal 130 and wireless appliance 110. According to some embodiments, communication device 142 may be as described in detail above with respect to communication device 122. Remote transceiver 143 is coupled to internet connection 170. In some embodiments, transceiver 143 may include a wireless transceiver, such as wireless transceiver 123 in wireless appliance 110. Further embodiments may include a transceiver 143 having an Ethernet connection, or a cable modem connection to a network.

Figure 2:
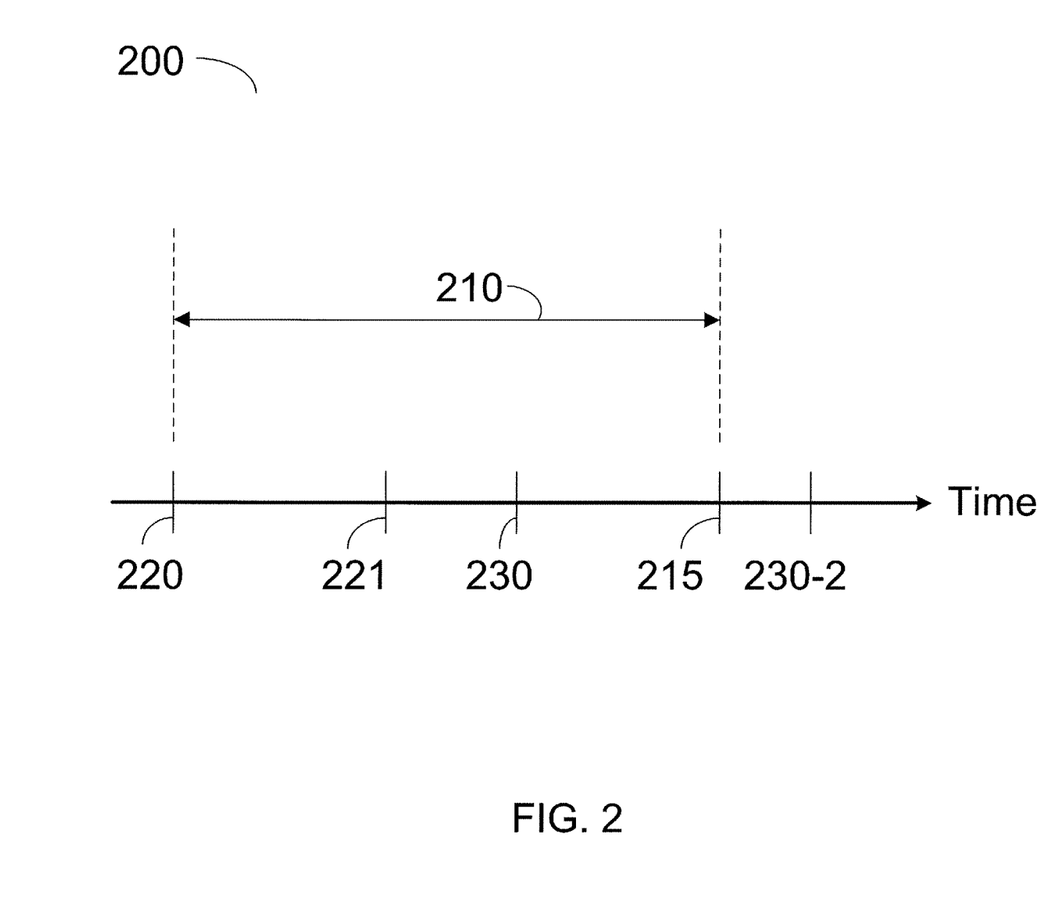
FIG. 2 shows a partial view of a timeline in a system for making offline wireless phone payments, according to embodiments disclosed herein.

FIG. 2 shows a partial view of a timeline 200 in a system for making offline wireless phone payments, according to embodiments disclosed herein. At point 220 a token is created by a server in direct communication with a user's wireless appliance. The token is transferred to a memory of the wireless appliance and a copy is kept at the server. A time stamp is associated to the token, including an expiration time for the token. The time stamp is stored at the server, together with the token. Time lapse 210 is the lifetime associated to the token created at time 220. According to some embodiments, time lapse 210 may be only a few minutes long. For example, in some embodiments, time lapse 210 may be about 30 minutes. In some embodiments, time lapse 210 may be an hour, or even more. Further according to some embodiments, the user may request a specific token lifetime to be used for time lapse 210. For example, in some embodiments a user may be traveling along a highway where network connectivity for wireless appliance 110 is expected to be spotty, at best. Thus, a user may desire to manually setup an extended time lapse 210 for a number of tokens, as long as the user expects to be on the road. Similar situations may occur when a user is travelling and expects to be making airline connections at places where connectivity may not be available, or may not be desirable due to roaming costs.

Event 221 may be a vending transaction using the token created at 220. For example, in event 221 a user may decide to purchase a piece of merchandise. At this time, the user transfers the token created at time 220 from the wireless appliance to a POS terminal such as 130 (cf. FIG. 1). In some embodiments, event 221 may be carried out using communication channel 180 between wireless appliance 110 and POS terminal 130. Event 221 includes communication of two close proximity partners such as wireless appliance 110 and POS terminal 130 (cf. FIG. 1).

In some embodiments, in event 230 POS terminal 130 validates the sale by transferring a token authentication protocol to server 150. Event 230 includes communication channel 170 to be open between POS terminal 130 and server 150 through an internet protocol. Thus, events 221 and 230 may not overlap in time, according to some embodiments. For example, events 221 and 231 may be separated in time, but not so much, so that event 230 may still occur within a time lapse 210 from event 220. Event 215, at the time of expiration of the token, is such that any transaction attempted by POS terminal 130 after event 215 is rejected by server 150. Thus, a transaction such as 230-2 attempted at a later time than 215 using the token created in step 220 is invalidated by server 150.

Figure 3:
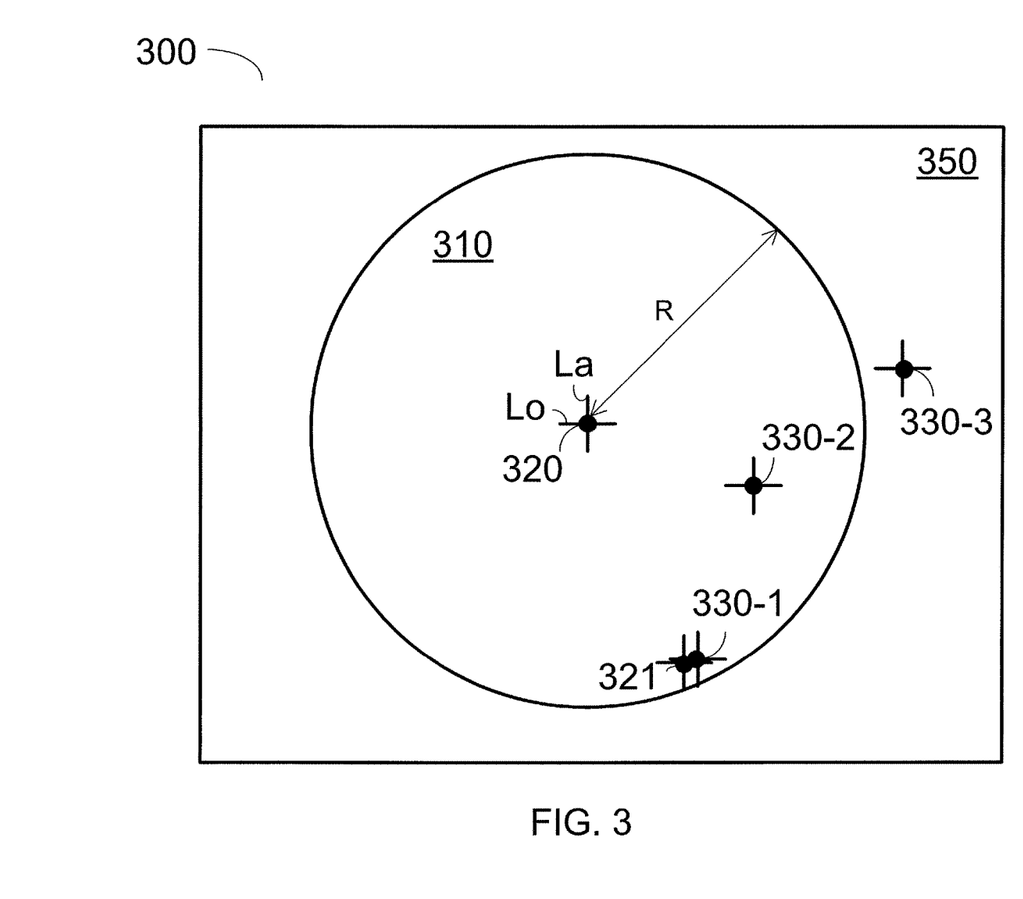
FIG. 3 shows a partial view of a geographical area in a system for making offline wireless phone payments, according to embodiments disclosed herein.

FIG. 3 shows a partial view of a geographical area 300 in a system for making offline wireless phone payments, according to embodiments disclosed herein. Geographical area 300 shows an extended zone 350 including a geofence 310. Points 320, 321, 330-1, 330-2, and 330-3 are determined by two coordinates. For example, the coordinates may be Longitude (Lo, South/North) and Latitude (La, East/West)). In some embodiments, geofence 310 is approximately a circle having a radius, 'R' centered at a point 320. Point 320 may be the position of a wireless appliance when a token is created in server 150. For example, point 320 may be the location for event 220 (cf. FIG. 2). Some embodiments may include a geofence 310 having different shapes and geometries. For example, in some embodiments the shape of geofence 310 may be determined by an urban environment, mountains and bodies of water. In further embodiments, the shape of geofence 310 may follow the route of streets and highways. Further according to some embodiments, the size of geofence 310, such as radius, 'R', may be determined by an estimated velocity of a user, as measured through the internet connection 160 of wireless appliance 110.

According to embodiments consistent with the present disclosure, a vending transaction attempted with POS terminal 100 located in point 330-1 may be approved by server 150, because point 330-1 lies within geofence 310. In some embodiments, the location 321 of wireless appliance 110 may be verified by server 150 through the service provider of internet connection 160 to wireless appliance 110. Thus, server 150 may verify that the user carrying wireless appliance 110 is at the same physical location as POS terminal 130, and approve the transaction. In some embodiments, a POS terminal located at 330-3 may request validation of a token to server 150. In such situation, server 150 may deny token authorization, since point 330-3 is outside of geofence 310. According to some embodiments, token authorization from a POS terminal in point 330-3 may be denied by server 150 regardless of the location of wireless appliance 110.

In some embodiments consistent with the present disclosure, a token authorization may be requested by a POS terminal located in point 330-2. Even if point 330-2 is within geofence 310, server 150 may deny token authorization. This may be the case for example if server 150 detects that the location of wireless appliance 321 and POS terminal 330-2 are not the same, nor reasonably similar to one another.

Figure 4:
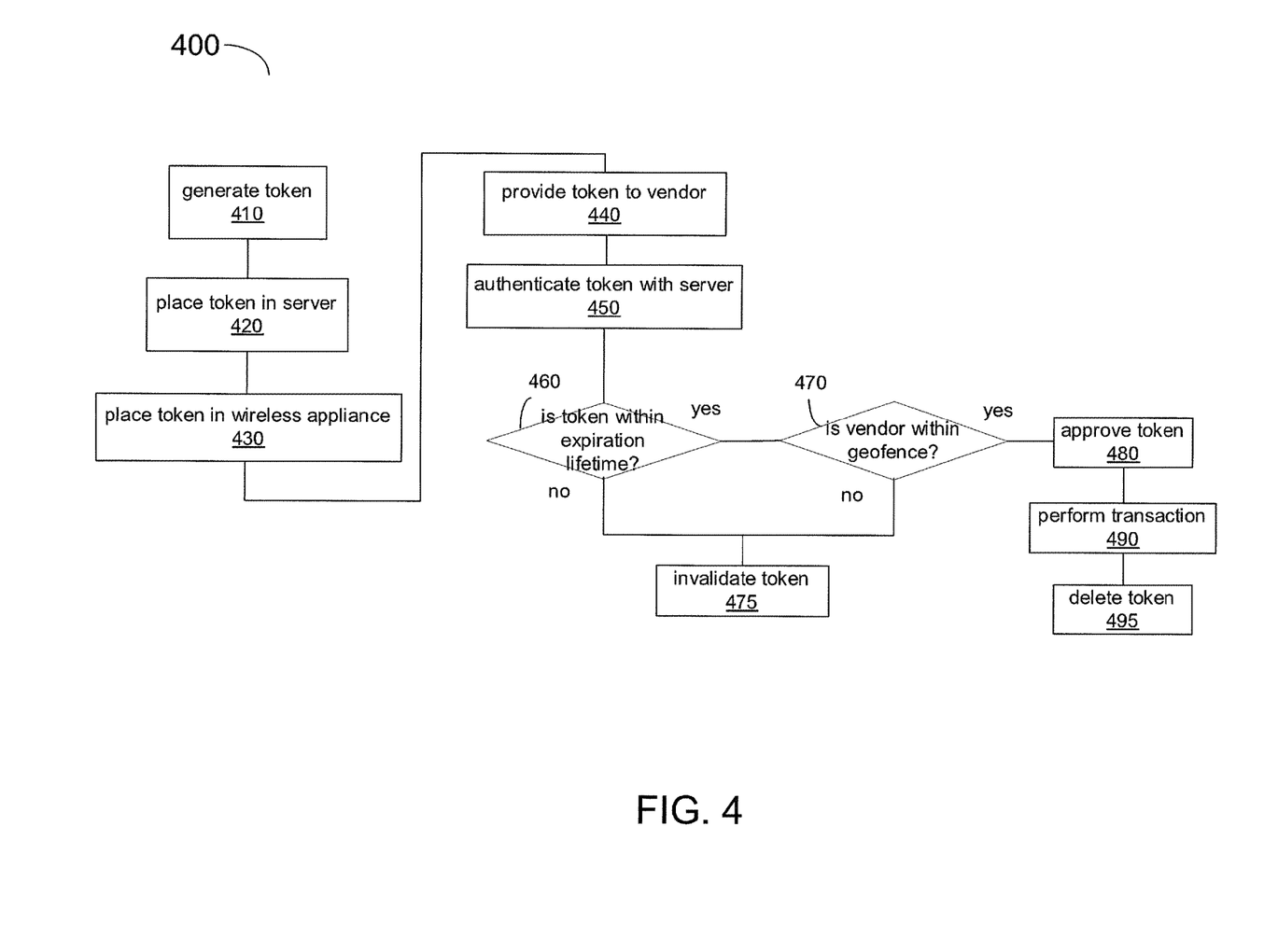
FIG. 4 shows a flowchart of a method for making offline wireless phone payments, according to embodiments disclosed herein.

FIG. 4 shows a flowchart of a method 400 for making offline wireless phone payments, according to embodiments disclosed herein. Step 410 generates a token. According to some embodiments, step 410 includes establishing a communication between a wireless appliance and a server. For example, the wireless appliance may execute a password or some other form of codification to access a private account in the server. The private account may be associated to the user carrying the wireless appliance. In some embodiments, an application running in the background of a wireless appliance may automatically request step 410 through an internet connection. This may be performed periodically by the application, or when a token in the wireless appliance has been used, or has been invalidated.

In step 420 the token is placed in the server, for storage. According to embodiments consistent with the present disclosure, the token generated in step 410 is stored in a server for a time lapse no shorter than time lapse 210 (cf. FIG. 2). In step 430 a copy of the generated token is placed in a wireless appliance. According to embodiments, steps 410-430 take place during a single communication session between wireless appliance 110 and server 150. Further according to some embodiments, a communication session including steps 410-430 may be started by an application running in the background of the wireless appliance. For example, an application starting steps 410-430 may be application 111, described in detail above in relation to FIG. 1.

In some embodiments consistent with the present disclosure, more than one token may be generated, placed in the server, and placed in the wireless appliance, as described in steps 410-430. Any integer number of tokens may be generated during a single communication session between the wireless appliance and the remote server.

In step 440 a token is provided to a vendor. According to some embodiments, the token is provided by a user having a wireless appliance able to transmit a token to a vendor. In embodiments consistent with the present disclosure, an application in the wireless appliance may use a communication device in the wireless appliance to provide the token. For example, application 111 may use communication device 122 to provide tokens 115-1 and 115-2 to the vendor (cf. FIG. 1). The vendor receives the token using a POS terminal connected to the internet. A POS terminal used in step 440 may be as described in detail above in relation to POS terminal 130 (cf. FIG. 1). Further according to some embodiments disclosed herein, application 111 may be running in the background of wireless appliance 110 and a user may bring application 111 to the foreground in order to perform step 440. In such embodiments, application 111 may request a password or a code from the user prior to perform step 440. For example, application 111 may request fingerprint recognition, a voice command, or a specific key sequence entered from the user in order to provide a token to the vendor.

In step 450 the token is authenticated with the server. In some embodiments, step 450 is performed by POS terminal 130 communicating with server 150 via an internet connection 170. In some embodiments, the data sent by POS terminal 130 to server 150 include a token string, a merchant identifier, and a total amount of the transaction desired.

Server 150 authenticates the transaction. In some embodiments, authenticating the transaction includes confirming the validity of the token string, ensuring the string exists in the remote server. For example, the token string may be tested for a match with a string in the server. Authenticating the transaction may include confirming that the token has not already been used. According to some embodiments, the server authenticates the transaction by checking that the location of wireless appliance 110 matches the merchant's location. Matching the locations of wireless appliance 110 and POS terminal 130 may be performed when the location of wireless device 110 is provided by the network to which wireless appliance 110 is subscribed.

In step 460 a query is provided to compare a current time with an expiration lifetime of the token. If the token has expired, then the token is invalidated in step 475, and the transaction is rejected. If the token has not expired then a query is provided to determine whether a vendor location is within a geofence from the point of creation of the token, in step 470. If the vendor is outside of the geofence then the token is invalidated (step 475). If the vendor is within the geofence then the token is approved in step 480.

Once the token is approved in step 480, the vending transaction is performed in step 490. Step 495 deletes the token. In some embodiments, step 495 may simply mark the token as used, for tracking purposes. According to some embodiments, the token is deleted from the remote account for the user, in the remote server. Further, in some embodiments step 495 includes deleting the token from the memory circuit in the wireless appliance. For example, in some embodiments, providing the token in step 440 may be performed after steps 450-480 are completed. In such embodiments, the token may be deleted from the wireless appliance immediately after it is provided to the POS terminal. At this time, a receipt may be sent to the wireless appliance for expense tracking.

According to embodiments disclosed herein, tokens are used one time only for vending transactions, in order to guarantee the safety of the user account. This is desirable in view of the high level of risk involved with the use of wireless appliances, which may be easily stolen, misplaced, or broken into by 'malware'.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A method for performing vending transactions, the method comprising:
   accessing, by a remote server, a first token and a second token upon request by a wireless appliance in communication with the remote server, the first token and the second token having a specific redeemable cash value and a geofence comprising a geographical area, wherein the second token is a copy of the first token, and the first token is configured for use with at least a plurality of merchants within the geographical area;
   sending, by the remote server, the first token to the wireless appliance;
   receiving, by the remote server, first data associated with a first vending transaction conducted with the first token from a first point-of-sale (POS) terminal, wherein the first token is provided to the first POS terminal from the wireless appliance before the first POS terminal provides the first data to the remote server and the first data comprises a token string from the first token, a first merchant identifier, and a first total amount of the first vending transaction;

authenticating, by the remote server, the first vending transaction based on the data received from the remote server;

determining, by the remote server, a first location of the first POS terminal through an internet connection to the first POS terminal;

determining, by the remote server, that the first location of the first POS terminal is outside the geographical area of the geofence;

rejecting the first vending transaction in response to the determining that the first location of the first POS terminal is outside the geographical area of the geofence;

invalidating, by the remote server, the first token in response to the determining that the first location of the first POS terminal is outside the geographical area of the geofence;

receiving, by the remote server, second data associated with a second vending transaction conducted with the first token from a second point-of-sale (POS) terminal;

determining, by the remote server, a second location of the second POS terminal;

determining, by the remote server, that the second location of the second POS terminal is within the geographical area of the geofence and that the first token is invalidated; and rejecting the second vending transaction in response to the determining that the first token is invalidated.

2. The method of claim 1, wherein the authenticating the first vending transaction with the remote server includes verifying that the token string matches a string from the second token.

3. The method of claim 1, further comprising:
using a time stamp associated with the first token to verify that the time of the first vending transaction is earlier than a lifetime for the first token.

4. The method of claim 1, wherein the authenticating the first vending transaction with the remote server includes confirming that the first token has not been used.

5. The method of claim 1, wherein the authenticating the first vending transaction with the remote server includes confirming that the location of the wireless appliance matches the first location of the first POS terminal.

6. The method of claim 1, further comprising deleting the second token.

7. The method of claim 1, wherein sending the first token to the wireless appliance includes sending the first token to a first-in-first-out buffer.

8. A method for using a remote server, the method comprising:
receiving, by the remote server, a request for a first token from a wireless appliance;

generating, by the remote server, the first token and a second token, wherein each of the first token and the second token comprises a time stamp, a specific redeemable cash value, and a geofence comprising a geographical area for validation, wherein the first token is configured for use with at least a plurality of merchants within the geographical area;

storing the first token in a non-transitory memory of the remote server, wherein the non-transitory memory is configured to store a plurality of tokens, at least two of the tokens having geofences of different geographical areas;

sending, by the remote server, the second token to the wireless appliance;

receiving, in response to a first transaction and from a first POS terminal, the second token;

determining a first location of the first POS terminal through an internet connection to the first POS terminal;

invalidating, by the remote server, the second token received from the POS terminal, wherein the invalidating comprises determining that the first location is outside the geographical area of the geofence;

rejecting the first transaction;

receiving, in response to a second transaction and from a second POS terminal, the second token;

determining a second location of the second POS terminal through an internet connection to the second POS terminal;

determining, by the remote server, that the second location is within the geographical area of the geofence and that the second token is invalidated; and rejecting the second transaction in response to the determining that the second token is invalidated.

9. The method of claim 8, wherein the first token and the second token are the same.

10. The method of claim 8, further comprising:
determining a lifetime of the second token using the time stamp; and verifying that a time of the first transaction is earlier than the lifetime of the second token.

11. A system comprising:
a non-transitory memory; and one or more hardware processors coupled to the non-transitory memory and configured to read instructions from the non-transitory memory to cause the system to perform operations comprising:

accessing a first token and a second token upon request by a wireless appliance in communication with the system, the first token and the second token having a specific redeemable cash value and a geofence comprising a geographical area, wherein the second token is a copy of the first token, and the first token is configured for use with at least a plurality of merchants within the geographical area;

sending the first token to the wireless appliance;

receiving first data associated with a first vending transaction conducted with the first token from a first point-of-sale (POS) terminal, wherein the first token is provided to the first POS terminal from the wireless appliance before the first POS terminal provides the first data to the system and the data comprises a token string from the first token, a merchant identifier, and a total amount of the first vending transaction;

authenticating the first vending transaction based on the first data;

determining a first location of the first POS terminal through an internet connection to the first POS terminal;

determining that the first location of the first POS terminal is outside the geographical area of the geofence;

rejecting the first vending transaction in response to the determining that the first location of the first POS terminal is outside the geographical area of the geofence;

invalidating the first token in response to the determining that the first location of the first POS terminal is outside the geographical area of the geofence;

receiving second data associated with a second vending transaction conducted with the first token from a second point-of-sale (POS) terminal;

determining a second location of the second POS terminal;

determining that the second location of the second POS terminal is within the geographical area of the geofence and that the first token is invalidated; and rejecting the second vending transaction in response to the determining that the first token is invalidated.

12. The system of claim 11, wherein authenticating the vending transaction includes verifying that the token string matches a string from the second token.

13. The system of claim 11, wherein the operations further comprise:

using a time stamp associated with the first token to verify that the time of the first vending transaction is earlier than a lifetime for the first token.

14. The system of claim 11, wherein the request by the wireless appliance comprises a request for a specific lifetime and the lifetimes of the first token and the second are the specific lifetime.

15. The system of claim 11, wherein the authenticating the first vending transaction includes confirming that the first token has not been used.

16. The system of claim 15, wherein the authenticating the first vending transaction includes confirming that the location of the wireless appliance matches the first location of the first POS terminal.

17. The system of claim 11, wherein the operations further comprise deleting the second token.

18. The system of claim 11, wherein sending the first token to the wireless appliance includes sending the first token to a first-in-first-out buffer.

19. The system of claim 11, wherein the operations further comprise deleting the second token.

* * * * *